No. 759,158. PATENTED MAY 3, 1904.
W. G. COX.
HYDRAULIC AIR COMPRESSOR.
APPLICATION FILED JAN. 19, 1903.
NO MODEL. 2 SHEETS—SHEET 1.

WITNESSES:
Robert Head
J. Fred Acker

INVENTOR
William G. Cox
BY Munn
ATTORNEYS.

No. 759,158. PATENTED MAY 3, 1904.
W. G. COX.
HYDRAULIC AIR COMPRESSOR.
APPLICATION FILED JAN. 19, 1903.
NO MODEL. 2 SHEETS—SHEET 2.

WITNESSES:
Robert Head
Fred Acker

INVENTOR
William G. Cox
BY
Munn
ATTORNEYS.

No. 759,158. Patented May 3, 1904.

UNITED STATES PATENT OFFICE.

WILLIAM G. COX, OF NEW YORK, N. Y.

HYDRAULIC AIR-COMPRESSOR.

SPECIFICATION forming part of Letters Patent No. 759,158, dated May 3, 1904.

Application filed January 19, 1903. Serial No. 139,608. (No model.)

*To all whom it may concern:*

Be it known that I, WILLIAM G. COX, a citizen of the United States, and a resident of the city of New York, borough of Manhattan, in the county and State of New York, have invented a new and Improved Hydraulic Air-Compressor, of which the following is a full, clear, and exact description.

The purpose of the invention is to provide a very simple, durable, and economic form of hydraulic air-compressor so constructed that water may be admitted at either side through what may be termed a "double chamber," one section of which chamber acts as a cushion to the incoming water, thus preventing hammering of the inlet-valve, which latter is especially formed to the same end.

Another purpose of the invention is to provide a central tubular guide for the float, which guide serves as an air-vent to relieve the body of the compressor from air at one period in the travel of the float, and also to provide means for operating the water inlet and outlet valve by the action of the float, together with means whereby the device is adapted for successful usage under varying water-pressure.

The invention consists in the novel construction and combination of the several parts, as will be hereinafter fully set forth, and pointed out in the claims.

Reference is to be had to the accompanying drawings, forming a part of this specification, in which similar charactens of reference indicate corresponding parts in all the figures.

Figure 1:
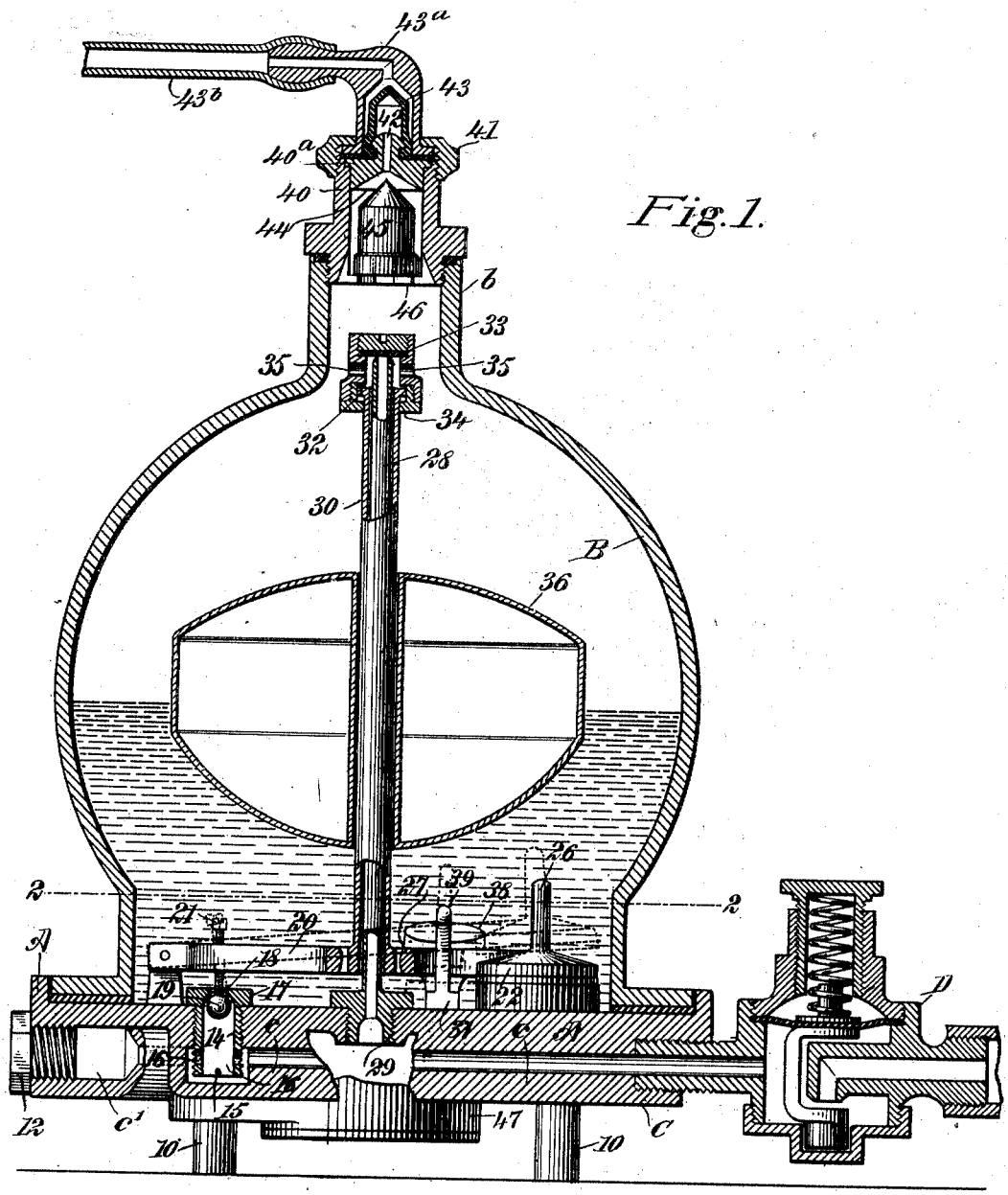
Figure 2:
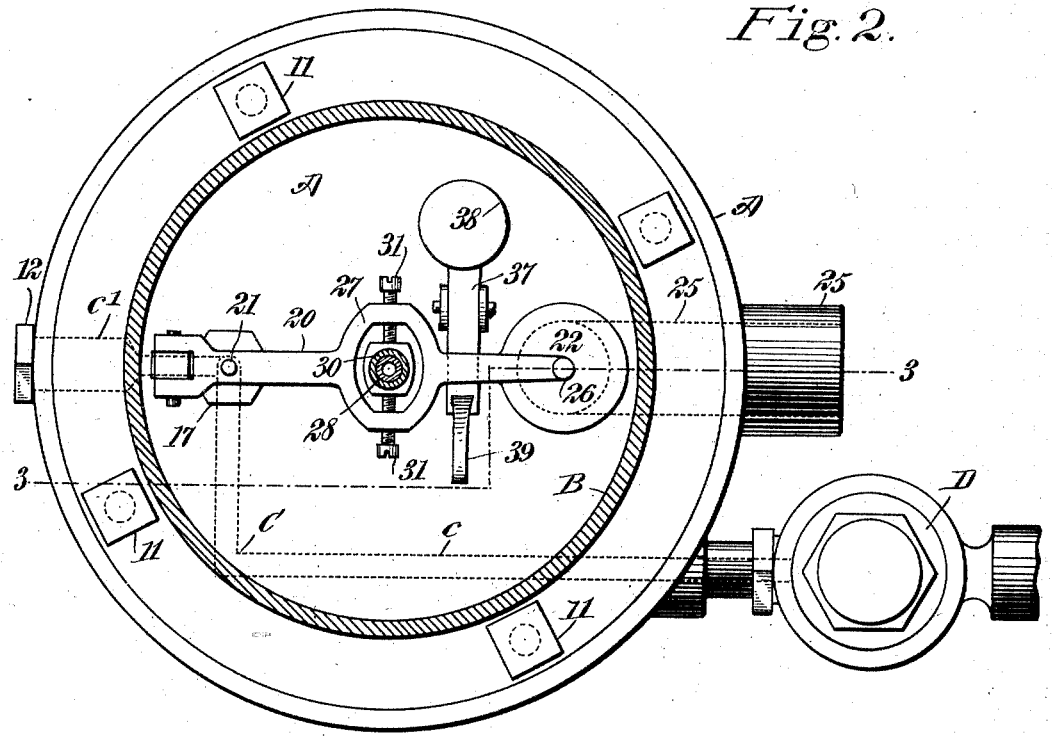
Figure 3:
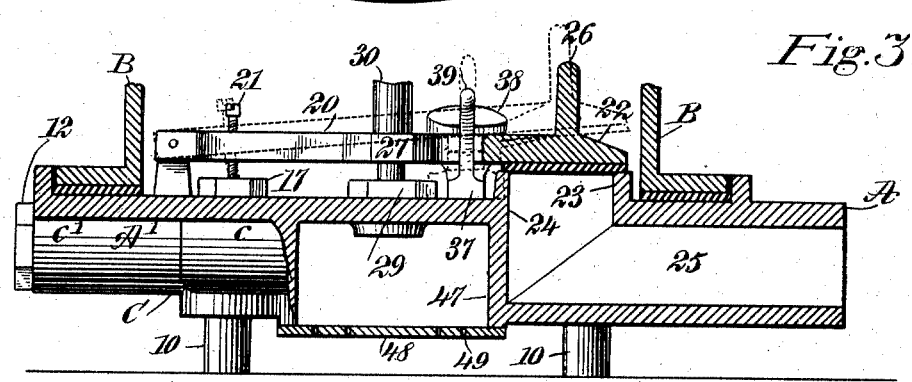

Figure 1 is a vertical section through the device. Fig. 2 is a horizontal section taken practically on the line 2 2 of Fig. 1, and Fig. 3 is a transverse section taken practically on the line 3 3 of Fig. 2.

The base-plate A, which is usually circular, is provided with and is shown as supported upon legs 10. This base-plate carries a shell or dome B, which is preferably of spherical form, as is illustrated in Fig. 1, being attached to the base by bolts 11 or their equivalents. A water-chamber C is formed at the bottom of the base. This water-chamber C receives water from any suitable source of supply and is practically made in two sections $c$ and $c'$, connecting usually near one side of the base, as is shown in dotted lines in Fig. 2, and the branches of the water-chamber C have their outer ends at opposite sides of the base.

One of the branches of the water-chamber C—the section $c'$, for example—is closed at its outer end by a suitable plug 12; but the outer end of either of the said branches may be so closed that water may be admitted through either branch of the said chamber C. When the chamber C is closed at one end by a plug 12, a suitable check-valve D is connected with the opposite end, which valve in its turn is connected with any service-pipe. Where the two branches $c$ and $c'$ of the water-delivery chamber C meet, an opening is made in the base, as is shown in Fig. 1, communicating with the said chamber and having an interior thread whereby to receive an exteriorly-threaded hollow plug 14, open at its bottom portion and provided at such portion with a transverse wire or rod 15, together with openings 16, the latter being in communication with both branches of the said water-supply chamber and with the junction of the two branches, as is shown in Fig. 1.

The plug 14 is preferably provided with a head 17 at the upper surface of the base, so that the plug can be readily removed when worn or damaged, and has a small outlet-opening 18 at the top. The inner upper portion of the chamber of the plug 14 is segmental, as is shown in Fig. 1, and a ball-valve 19 is loosely placed in the chamber of the plug 14, being prevented from falling out by the rod 15. When the valve is seated at the upper segmental portion of the plug 14, it closes the upper opening 18 in the plug. This valve 19 is an inlet-valve and controls the supply of water to the dome B.

A valve-carrying arm 20 is pivoted at one end upon a suitable stud and extends from the base adjacent to the valve-plug 14 and in direction of the opposite side of the device over the opening to be closed by the inlet-valve 19. The valve-carrying lever-arm 20 is provided with an adjusting-screw 21 near its pivotal end, forming an extension from the lower face of the lever-arm, which extension in the lower position of the lever-arm 20 enters the opening 18 to be closed by the inlet-valve 19 and by engagement with the said valve 19 forces the said valve downward against the pressure of the water, thus automatically unseating the valve no matter what the water-pressure may be.

It will be observed that the screw 21 is in no manner an integral portion of the valve 19, as the valve is a ball-valve and is not connected with any stem, the screw 21 simply acting on the ball to operate it so that it can assume proper positions within the valve-casing 14. It will be further observed that the valve-casing 14 is not an integral portion of the base, but is detachably attached to the base, preferably by being screwed thereon, so that the said valve-casing may be readily removed and replaced in the event it becomes defective from wear or from other causes.

An outlet-valve 22 is secured to the free end of the lever-arm or valve-carrier 20, adapted in the lower position of the valve-carrier or lever-arm to be seated upon a flange 23, surrounding an outlet-opening 24, produced in the base A, and close the said opening, which outlet-opening 24 is in direct communication with the outlet channel or chamber 25, adapted for connection with any suitable offtake, as is shown in Figs. 2 and 3. This outlet-valve 22 is provided with an upwardly-extending preferably centrally-located lug 26. Over the central portion of the base A the valve-carrier or lever-arm 20 is provided with a horizontal yoke-section 27, and through the central portion of this yoke-section a vertical tube 28 is passed, having a tubular enlarged lower section 29, screwed into the central portion of the base A in communication with the outside atmosphere, as is best shown in Fig. 1. This stationary tube 28 is open at the top, and its upper end is more or less beveled. The said stationary tube under certain conditions conducts the confined air from the dome B and permits air to enter the said dome. The vent-tube 28, it will be observed, is unobstructed throughout its length, the inner end of the tube being in direct communication with the interior of the dome B when the upper portion of the tube is uncovered, while the lower end of the said vent-tube is at all times in direct communication with the outside atmosphere.

An outer tube 30 is mounted to slide loosely upon the stationary air-vent tube 28, terminating short of the upper end of the said stationary air-vent tube and having its lower end adjustably and removably secured to the yoke-section of the valve-carrier or lever-arm 20, usually by set-screws 31, as is illustrated in Fig. 2, so that the outer tube 30 rises and falls with the corresponding movements of the valve-carrier 20.

A collar 32 is exteriorly formed at the upper end of the movable tube 30, and a bonnet-valve 33 normally closes the upper end of the stationary vent-tube 28, the said bonnet-valve being provided with bottom flanges 34, which extend beneath the collar 32 of the movable tube 30, and a flange 34ª, extending above said collar, the bottom flanges 34 having such relation to said collar that the bonnet-valve may be raised sufficiently to unseat it without acting upon the collar 32 of the said movable tube 30 to raise said tube, and consequently the valve-carrier 20. When the bonnet-valve 33 is thus raised, air is admitted from the dome B through openings 35 in the bonnet-valve to the vent-tube 28, passing from thence to the atmosphere, thereby at such times reducing the pressure in the upper part of the dome. As soon as the pressure is reduced by the air passing from the dome through the vent-tube the bonnet-valve is caused to move farther upward, as will be hereinafter explained, raising the tube 30 and valve-carrier 20, and thereby opening the outlet-valve 22 to permit the water to flow out of the dome, the air at this time passing into the dome through the vent-tube to promote the flow of water at the outlet-opening.

In order to insure the valve-carrier 20 remaining elevated while the water from the dome is being discharged, a counterbalance-lever 37, counterbalancing the valve-carrier 20, is fulcrumed on the base-plate A, and the said lever passes beneath the valve-carrier or lever-arm 20 between its yoke-section 27 and its free end, as is best shown in Fig. 2. This counterbalance-lever 37 is provided at its upper end with an upwardly-extending horn or stud 39 and at its opposite end carries a weight 38, which weight is sufficiently heavy to about balance the lever or valve-carrying arm 20. When the said lever or valve-carrying arm is in its horizontal or normal position, in which position the inlet-valve is open, forced down by the adjusting-screw 21, and the outlet-valve is closed, the weighted end of the counterbalance-lever 37 is raised and its stud-carrying end is lowered, as is shown in positive lines in Figs. 1 and 3. The action of this counterbalance-lever will be hereinafter particularly described.

At the upper end of the dome B a neck $b$ is formed, and within this neck the bonnet-valve 33, heretofore referred, to extends to a greater or less extent. A valve-casing 40 is secured to the upper portion of the said neck $b$, and this casing is provided at its upper end with a plug 40ª, held in place by a suitable gland 41, and this plug is provided with a vertical opening 42, extending through it and communicating with a conical recess 44 in the bottom of the said plug, as is shown in Fig. 1. Above the opening 42 in the said plug 40ª a split valve 43 is secured. This valve and its casing is a delivery-valve and is adapted to permit the air compressed in the dome B to be forced out through the said split section 43 into a tube 43ª, connected, usually by a hose 43ᵇ, with any receptacle adapted to receive the compressed air; but in the event an accident should happen to the working parts of the device and the water in the dome B should have a tendency to overflow into the compressed-air-delivery pipe 43ª such a disposition of the water is prevented by locating what I term an "overflow-valve" 45 in the casing 40, supported upon a spider 46 at the bottom of the casing. The upper end of this valve 45 is conical, so that when an overflow of water occurs in the said dome the water will raise the valve 45 and seat it in the recess 44, thus preventing the water from leaving the dome until it can be properly discharged. A float 36 is mounted to slide on the outer tube 30, and this float may be of any suitable construction; but for convenience its upper and its lower surfaces are rendered more or less convexed, as is illustrated in Fig. 1.

A well 47 is preferably constructed at the bottom portion of the base A just below the outlet end of the vent-tube 28, and this well is provided with a removable bottom 48, in which apertures 49 are produced, as is shown in Fig. 3, and the well and its apertured bottom are provided in order to prevent dust and other foreign matter being sucked up into the dome through the said vent pipe or tube 28.

In operation the water enters the valve D and passes from said valve into, for example, the branch c of the water-supply chamber C and from thence into the tubular plug 14, and the valve-carrying arm or lever 20 being in its lower position the valve 19 will be unseated, due to the pressure thereon by the screw 21, and water will enter the dome B in suitable quantities and will raise the float 36. When the float 36 engages with the bottom of the bonnet-valve 33, it will raise the said valve sufficiently to unseat the valve and permit the confined air to escape through the vent-tube 28, the volume of compressed air having already passed up through the relief or delivery valve at the upper portion of the dome. As the float in its upward movement must finally lift the outer tube 30 and the valve-carrier 20, it is necessary that the pressure in the upper part of the dome be reduced to permit of this operation, and this is accomplished by the above-described initial movement of the bonnet-valve, actuated by the float, before the latter begins to lift the tube 30. In the further upward movement of the float in contact with the bonnet-valve 33 the said bonnet-valve is raised sufficiently to be brought into engagement with the collar 32 on the outer tube 30, which tube is connected with the lever carrying-arm 20, and consequently the said lever carrying-arm is raised and the weight 38 of the counterbalance-lever 37 drops downward, carrying the opposite end of the said lever upward. The pivoted end of the valve-carrying arm is now supported in its upper position by the adjusting-screw 21, resting upon the ball-valve 19, held seated by the pressure of the incoming water, and at such time the outlet-opening 24 for the water is fully uncovered, and the valve 22 is held open for the outflow of the water by reason of the screw 21, resting on the closed valve 19, as stated, and the sustaining power of the counterbalance-lever 37, near the free end of the said valve-carrying arm. As the water commences to flow out through the outlet-chamber 25 the float 36 will move downward with the water; but the bonnet-valve will still be held in the open position by the tube 30, now held in the raised position, the collar 32 of said tube engaging the flange 34ª of the valve. When the water has flowed from the dome B, the float 36 will be at the bottom of the dome, and the float in such position will first engage with the stud 39 on the counterbalance-lever 37, forcing said lever from the valve-carrying arm, and will next engage with the stud 26 on the outlet-valve 22 and will thus first overcome the balancing tendency of the said lever 37 and next force the valve-carrying arm 20 to quickly drop, and the weight of the float on the outlet-valve 22 will tend to accelerate the closing action of the said valve. The bonnet-valve will at the same time be restored to its normal sealed position, closing the vent-tube 28.

It will be observed that as the water-supply chamber C is closed at one end and receives its supply of water at its opposite end and as the inlet-valve 19 of the dome is located between two branches of said chamber C one branch of the chamber serves as a cushion for the water entering the opposite branch, thus preventing any possible pounding of the aforesaid inlet-valve 19.

Having thus described my invention, I claim as new and desire to secure by Letters Patent—

1. In hydraulic air-compressors, a body-section provided with an inlet for liquid and having an air-delivery valve at its upper portion, a tubular guide within the body-section for admitting air to the same, the said guide being in communication with the outside atmosphere and unobstructed throughout its length, a bonnet-valve normally closing the inner end of the tubular guide, a water-outlet for the said body-section, a lever-controlled valve for the said outlet, an auxiliary tube on the guide and forming a connection between the lever-controlled valve and the bonnet-valve, to move the lever-controlled valve on the final upward movement of the bonnet-valve, and a float mounted to slide upon the said auxiliary tube, which float upon its upward movement first raises the bonnet-valve to uncover the tubular guide, and next further raises the bonnet-valve to move the lever-controlled valve to uncover the water-outlet opening in the body of the device, as specified.

2. In hydraulic air-compressors, a body-chamber having a valve-controlled outlet for air leading therefrom, a water-inlet chamber extending beneath the body-chamber from side to side and having an opening at one end and closed at the other, a check or regulating valve connected with the open end of the chamber, a water-inlet-valve casing in the said water-chamber between its ends, a ball-valve in the said casing, a water-outlet valve for the body-chamber, a lever within the body-chamber, carrying the water-outlet valve, an extension from the said lever operating to force the ball-valve from closing position in the water-inlet casing when the water-outlet valve is seated, a float within the body-chamber in operative connection with the said valve-lever and a guide for the float, the body-chamber being provided with an air-inlet, as set forth.

3. In hydraulic air-compressors, a chambered body provided with a water-inlet chamber and a water-outlet chamber, and having a water-inlet opening in communication with the body-chamber and the water-inlet chamber, and a water-outlet opening between the said water-outlet chamber and the body-chamber, the said body-chamber being further provided at its upper portion with an air-delivery outlet, a lever-arm pivotally mounted at the bottom of said body-chamber, a ball-valve for the said water-inlet opening, a removable casing for the ball-valve, an adjustable device carried by the lever-arm and extending from the same for operating the ball-valve, a water-outlet valve carried by the end of the lever-arm to control the said water-outlet opening, a vent-tube extending into the body-chamber and adapted when uncovered to first permit air to pass from said body-chamber, and then to admit air to the said chamber, an auxiliary tube mounted to slide on the vent-tube and connected with the said lever-arm, an apertured bonnet-valve which normally closes the inner end of the vent-tube, a connection between the auxiliary tube and the bonnet-valve, and a float mounted to slide on the outer or auxiliary tube and engage with the said bonnet-valve, which float first raises the bonnet-valve to uncover the vent-tube and next acts to raise the valve-carrying lever-arm, for the purposes set forth.

4. In a hydraulic air-compressor, a base, a dome upon the base, a water-inlet chamber below the base, a tubular plug removably secured in the base and having connection with the water-inlet chamber and opening at its upper end into the dome, the said plug having its upper end portion cylindrical, a ball-valve located within the said plug and adapted to normally close the water-inlet opening to the dome, means located at the bottom portion of the plug for preventing the said valve from leaving said plug, a lever-arm fulcrumed upon the base within the dome, a valve carried by the lever-arm and adapted to normally cover a water-outlet opening in the base, means carried by the lever-arm for engagement with the ball-valve, an inlet for air to said dome, and an outlet for the compressed air, as described.

5. In a hydraulic air-compressor, a base, a dome upon the base, independent water inlets and outlets for the dome extending from the base, a plug or casing removably attached to the base and extending within the water-inlet, which casing or plug has an opening at the bottom and at the top, a ball-valve having free movement in the said plug or casing, means for preventing the ball-valve from leaving the plug or casing, a lever-arm pivoted upon the base within the dome, an adjusting-screw carried by the lever-arm, normally in engagement with the said ball-valve, a valve for the water-outlet opening of the dome carried by the lever-arm, a counterbalance-lever within the dome, having engagement with the under surface of the lever-arm, a tubular air-vent within the dome, extending through the base, being open at the top and at the bottom and being in communication with the outside atmosphere at the bottom, the said air-vent tube serving to admit air to the dome, and also serving when first uncovered to permit air to pass from the dome, for the purpose set forth, a bonnet-valve having apertures therein, mounted upon the upper end of the air-vent tube to normally close the same, an auxiliary tube mounted to slide on the air-vent tube and connected with the bonnet-valve and likewise with the said lever-arm, and a float mounted to slide freely upon the said auxiliary tube, which float in its lower position operates the said counterbalance-lever, and in its upper position first uncovers the upper end of the vent-tube and next raises the auxiliary tube a sufficient distance to carry the lever-arm upward and thus uncover the outlet-opening in the base of the device, at the same time permitting the ball-valve controlling the inlet of the water to seat itself and prevent the inflow of water to the dome, the said adjusting-screw on the lever-arm acting when the outlet-valve is closed to force the ball-valve from its seat and permit the water to flow into the dome and an outlet for the compressed air leading from the dome for the purposes set forth.

In testimony whereof I have signed my name to this specification in the presence of two subscribing witnesses.

WILLIAM G. COX.

Witnesses:
J. FRED. ACKER,
JNO. M. RITTER.